United States Patent
Ichikawa et al.

[11] 4,387,133
[45] Jun. 7, 1983

[54] LAMINATED LIGHT-POLARIZING SHEET

[75] Inventors: Rinjiro Ichikawa; Chiyoji Hitomi, both of Otsu, Japan

[73] Assignee: Toyo Boseki Kabushiki Kaisha, Osaka, Japan

[21] Appl. No.: 280,491

[22] Filed: Jul. 6, 1981

[30] Foreign Application Priority Data

Jul. 11, 1980 [JP] Japan .................. 55-95380

[51] Int. Cl.³ .................. B32B 15/08; G02B 5/30; B32B 27/38
[52] U.S. Cl. .................. 428/215; 350/370; 350/337; 427/163; 427/124; 428/334; 428/335; 428/336; 428/411; 428/416; 428/418; 428/419; 428/425.8; 428/413; 428/458; 428/463; 428/480; 428/522; 428/910
[58] Field of Search .................. 428/1, 425.8, 418, 419, 428/413, 215, 480, 458, 463, 411, 522, 910, 416, 334–336; 350/337, 370; 427/163, 124

[56] References Cited

U.S. PATENT DOCUMENTS

| | | | |
|---|---|---|---|
| 3,924,932 | 12/1975 | Yamamoto | 350/337 |
| 4,109,052 | 8/1978 | Anderson | 428/463 |
| 4,229,498 | 10/1980 | Suzuki | 428/442 |
| 4,230,768 | 10/1980 | Hamada | 428/442 |
| 4,292,370 | 9/1981 | Pekko | 428/1 |

FOREIGN PATENT DOCUMENTS 56-33613  4/1981  Japan .................. 427/163

*Primary Examiner*—Ellis P. Robinson
*Attorney, Agent, or Firm*—Oblon, Fisher, Spivak, McClelland & Maier

[57] ABSTRACT

A laminated light-polarizing sheet comprising a film or sheet of a polymer, especially a phenoxyether polymer, laminated at least on one surface of a light-polarizing film and a transparent conductive layer formed by vacuum metal evaporation etc. on a surface of a film or sheet to the light-polarizing film, wherein the film or sheet has specified ranges of retardation value, heat distortion temperature, average visible light transmittance, water vapor permeability, Izod impact strength and degree of swelling in solvents.

17 Claims, 18 Drawing Figures

(A)

(E)

(B)

(F)

(C)

(D)

(G)

F I G. 12
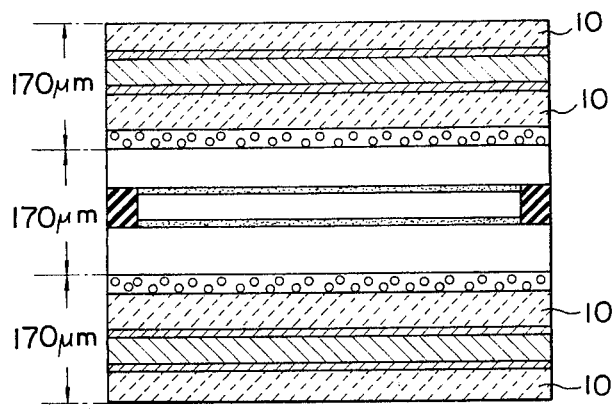
F I G. 13
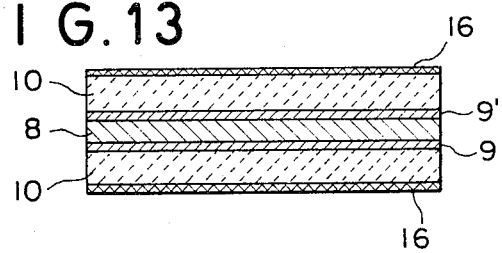
F I G. 14
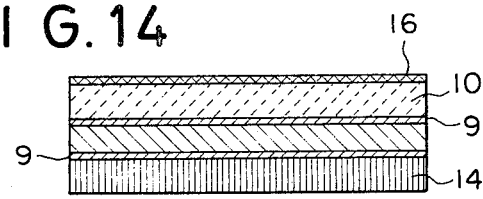
F I G. 15
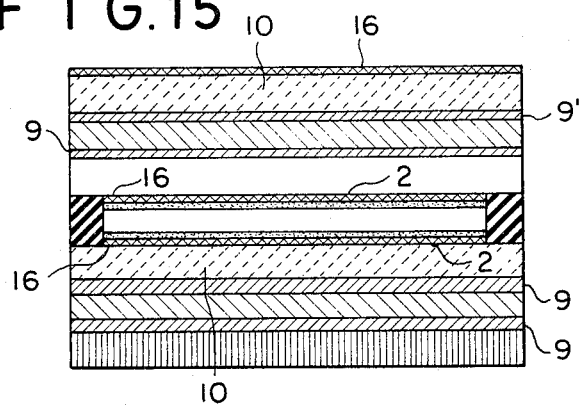

LAMINATED LIGHT-POLARIZING SHEET

BACKGROUND OF THE INVENTION

1. Field of the Invention

The present invention relates to a light-polarizing sheet for liquid crystal display devices.

2. Description of the Prior Art

The conventional liquid crystal display panels are made from a light-polarizing sheet laminated on a base glass plate with an adhesive agent. The manufacturing procedure is illustrated in FIG. 1. (A) a conductive layer (2) is formed on one side of a base glass plate (1), (B) a literal pattern (3) is formed by such an appropriate procedure as photo-etching or printing, (C) the surface is covered with an oriented film (4) by coating and thus coated layer is rubbed and seal-printed. (D) two conductive base plates (5) thus obtained are brought together with a spacer (6) and the space or clearance is saturated with a liquid crystal (7). On the other hand, (E) a light-polarizing sheet (13) is prepared from a light-polarizing element film (8) laminated with a supporting film (10) with or without an adhesive (9). And the one surface of the supporting film (10) is bonded with a release film (12) with a pressure sensitive adhesive (11). (F) another light-polarizing sheet laminated with a reflexive plate (14) on one surface is prepared by the same procedure. (G) each of the light-polarizing sheet (13) is bonded on the back side of the base conductive plate (5) [of the base glass plate (1)] with a pressure sensitive adhesive after peeling off the release film (12).

However, the reduction of the thickness of these panels is impossible, because the mechanical properties of the base glass plate are limited. These composition prevents a continuous procedure (endless length of film) that is expected from an efficient production. Moreover the poor impact strength is a problem and panels made of a plastic film (or sheet) are looked forward to.

Plastic sheets, however, have the following problems for this object.

(1) have tendency to deteriorate when it is exposed to organic chemicals during pattern-forming processes and to liquid crystals during the saturation process.

(2) poor moisture resistance (3) insufficient flexibility, and even insufficient rigidity to give good workability for panel assembly.

(4) thickness reduction may be realized but have such problems as distortion and bending of panels and heterogeneous clearance.

(5) may form bubbles by heating, because some pressure sensitive adhesives that have tendency to give bubbles by heating are used for lamination.

(6) insufficient dimensional stability at an elevated temperature.

SUMMARY OF THE INVENTION

Under these circumstances, we have studied intensively to establish a technology by which base plastic films have dominant effects for this application. The main object of this invention is to provide a laminated light-polarizing sheet with a transparent conductive layers having excellent chemical resistance, humidity resistance, light resistance, optically isotropic property, heat resistance, flexibility and mechanical property. Another object of the present invention is to provide a thin laminated light-polarizing sheet which hardly bends or becomes distorted during the production of liquid crystal display devices. And a further object of the present invention is to provide a laminated light-polarizing sheet that can be assembled into liquid crystal display devices without pressure sensitive adhesives that have a tendency to form bubbles by heating. Other objects and advantages of the present invention will be apparent from the following descriptions.

According to the present invention, the above and other objects are generally accomplished by the following composition. That is to say, the laminated light-polarizing sheet of the present invention is one comprising a film or sheet of a polymer laminated at least on one surface of a light-polarizing film and a transparent conductive layer formed on a surface of a film or sheet to the light-polarizing film, where the film or sheet has a retardation value of not more than 30 $\mu$m, a heat distortion temperature of not lower than 80° C., an average visible light transmittance of not less than 75%, a water vapor permeability of not higher than 30 g/24 hr./m$^2$, an Izod impact strength of not less than 1.5 kg·cm/cm and a degree of swelling on a surface in a solvent of not more than 0.5% under the solvent resistance test described heretoafter.

BRIEF DESCRIPTION OF THE DRAWINGS

FIGS. 2, 3, 4, 5, 6, 13 and 14 illustrate sections of light-polarizing sheet of the present invention.

FIGS. 7, 9, 10, 11, 12, 15 and 16 are sectional elevations of liquid crystal display panels embodying this invention.

DETAILED DESCRIPTION OF THE INVENTION

Figure 1:
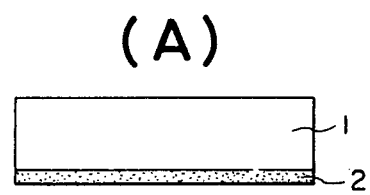
FIGS. 1$a$–$g$ illustrate sections of manufacturing procedure for a conventional liquid crystal display panel.
Figure 1:
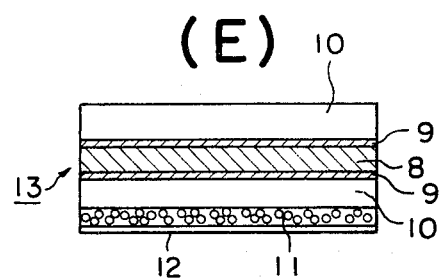
Figure 1:
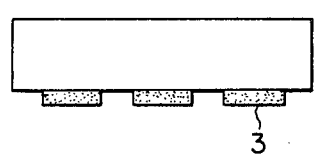
Figure 1:
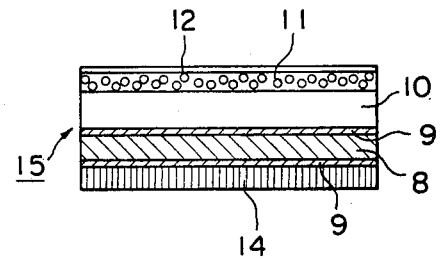
Figure 1:
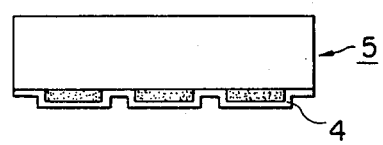
Figure 1:
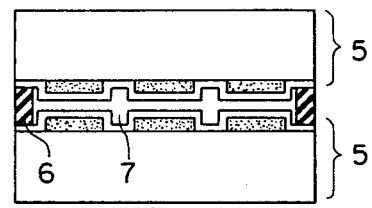
Figure 1:
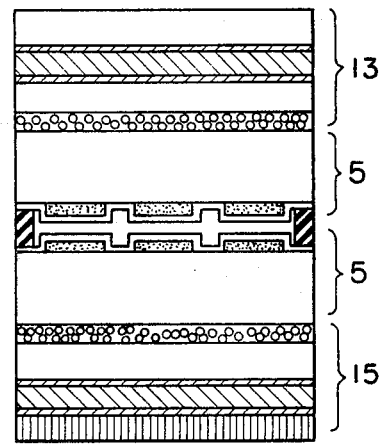
Figure 2:
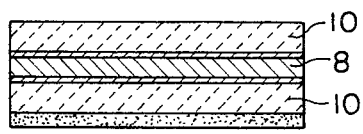
Figure 3:
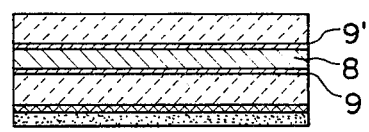
Figure 4:
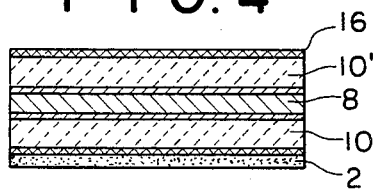
Figure 5:
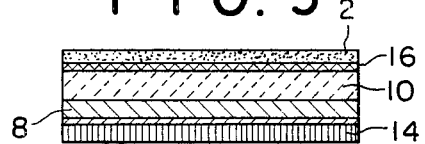
Figure 6:
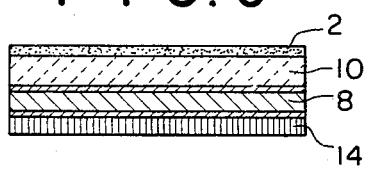

All kinds of film, regardless they are known or unknown, if they have a light-polarizing effect, could be employed in the present invention. Therefore, commonly used polyvinyl alcohol-iodine systems and olefine/vinyl-alcohol copolymer-iodine systems can also be employed. These systems have an enough resistance to heat of vacuum metal evaporation process and so on after they are laminated with transparent films described heretoafter. Because conductive layer formed by vacuum metal evaporation and so on is often heated to increase the bonding and the transmittance properties, and it is treated with chemicals solvent during the formation of a literal pattern, a light-polarizing film having an excellent moisture resistance at high temperatures and an excellent chemical resistance is desirable. Examples of the desired system of light-polarizing film are grafted copolymers comprising polyvinyl alcohol and water insoluble addition polymerizing monomers-dichroic dyes, polyvinyl alcohol-dichroic dyes, olefine/vinyl alcohol copolymers-dichroic dyes, olefine/vinyl alcohol copolymers-polyenes, polyvinyl alcohol-polyenes, poly-halogenated vinyl-polyenes, polyacrylonitrile-polyenes, poly(metha)acrylate-polyenes, etc.

Transparent sheets laminated on the light-polarizing film will be described. The sheet or film should be optically isotropic and have a retardation value (R.value) of not more than 30 m$\mu$. The R-value is expressed as the product of the thickness (d) of a film and the absolute value of the differences between the refractive indices ($n_1$) and ($n_2$) in any two directions within the planes of said film which are perpendicular to each other, that is, $$R = d|n_1 - n_2|$$

wherein $n_1$ is the refractive index in any direction and $n_2$ is that in the direction perpendicular to the above direction.

If this R value exceeds 30 m$\mu$, the angle of view suitable for a panel is narrowed, and at the same time, interference streaks appear to detract from the legibility of the liquid crystal display. The sheet or film should have dimensional stability at high temperatures and have a heat distorsion temperature of not lower than 80° C., preferably higher than 130° C. If the heat distorsion temperature is lower than 80° C., the sheet or film is undesirably deformed at a conductive layer forming stage by vacuum metal evaporation and so on or a film aging stage.

The water vapor permeability of the sheet or film at 22.8° C. should be not higher than 30 g/m$^2\cdot$24 hrs. preferably 10 g/m$^2\cdot$24 hrs. If the permeability is higher than 30 g/m$^2\cdot$24 hrs. water will penetrate into a liquid crystal cell, accelerate the deterioration of a liquid crystal and reduce the display efficiency.

The sheet or film should have an average visible light transmittance of not less than 75%, preferably 80%. When it is lower than 75%, the display efficiency reduces significantly.

The sheet or film at 22.8° C. should have an Izod impact strength of not lower than 1.5 kg·cm/cm, preferably 2 kg·cm/cm. When it is lower than 1.5 kg·cm/cm, the sheet or film will be damaged or broken at the cell forming process by cutting. Further, the degree of swelling of the sheet or film should be not more than 0.5%, preferably 0.05%. If it exceeds 0.5%, the sheet will loose chemical stability at a liquid crystal cell stage and break after a liquid crystal packaging. Chemical stability will be improved significantly when the degree of swelling is lower than 0.05%.

Polymers that satisfy the above requirements should be amorphous, because crystalinity reduces a transparent property and exhibits an optical anistrope that make R value higher. All the resins that satisfy these requirements could be employed in the present invention, however, considering from the application to the present invention, resins having such chemical stabilities as resistance to organic chemicals and to liquid crystals are desirable. In the polymers that can be used in the present invention, one having excellent chemical stabilities (Group A) described above could be employed without modification, and the other having poor chemical stabilities (Group B) could be used after covering with cured film layers.

Examples of Group A are 4-methylpentene-1 polymers, acrylonitrile polymers, phenoxyether polymers, cross-linked phenoxyether polymers, cellulose esters and vynyl polymers. But in these resins in Group A, cellulose esters and vinyl polymers have some degree of problems as to water vapor permeability and heat resistance, they may be classed into Group B.

The most desirable polymer for the present invention is a phenoxyether polymer having more than 20 of the units and not less than 50 weight percent of the formula:

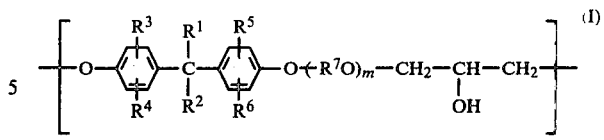

(wherein $R^1$ to $R^6$ are hydrogen or alkyl groups containing 1 to 3 carbon atoms, $R^7$ is an alkylene group containing 2 to 4 carbon atoms and m is an integer of 0 to 3.) or a cross-linked phenoxy ether polymer cross-linked by the reaction of active hydrogen groups of a phenoxyether polymer having the above repeating units or a mixture thereof and other polymers with a polyfunctional compounds.

In the above formula, $R^1$ to $R^6$ are hydrogen and alkyl groups having 1 to 3 carbon atoms. Examples are such saturated alkyls as methyl, ethyl, isopropyl and so on. $R^7$ is an alkylene group having 2 to 4 carbon atoms. Examples are ethylene, propylene, trimethylene and butylene.

In the polymers discribed in the above formula I, the most preferable is a polymer of formula:

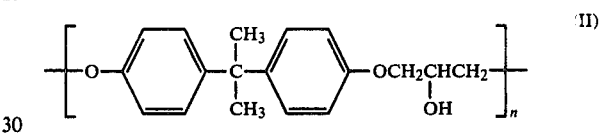

(wherein n is an integer of 50 to 800)

Phenoxy ether polymers described above are well-known polymers that are obtained through condensation reaction between epichlorhydrin and bisphenol A or its derivatives of the formula:

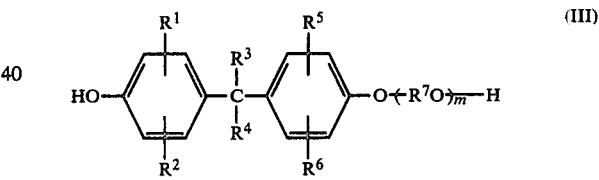

(wherein $R^1$ to $R^7$ are same as in formula (I).)

The polyfunctional compounds of this invention include compounds containing two or more (which may be the same or different) groups highly reactive to hydroxyl, such as isocyanate group, carboxy group, active groups derived from carboxy group (e.g. halides, active amides, active esters, acid anhydrides, etc.) and mercapto groups. Suitable examples are such isocyanates as tolylenediisocyanate, m-phenylenediisocyanate, p-phenylenediisocyanate, 4,4'-diphenylmethanediisocyanate, etc.; such blocked polyisocyanates as phenol blocked tolylenediisocyanate, etc.; such polycarboxylic acids as adipic acid, tartaric acid, sebacic acid, phthalic acid, etc.; reactive derivatives from carboxyl groups thereof; such mercapto substituted organic carboxylic acids as thioglycolic acid, etc.; and epichlorohydrin; sodium thiosulfate; melamine-formaldehyde; phenol resins; urea-formaldehyde resins; and the like.

The polymers blended into the phenoxyether polymers of the present invention are not limited, only if the sheet or film made from the mixture is transparent.

Examples are epoxy resins (Epotohte® YD-128, YD-011, produced by Tohto Kasei Co., Ltd.) phenol resins (Hitanol® 4010 produced by Hitachi Chemical Co., Ltd.) urea resins (Melan® 11, produced by Hitachi Chemical Co., Ltd.), melamine resins (Uban® 20SE-60 produced by Mitsui Toatsu Chemicals, Inc.), xylene resins (Nikanol® produced by Mitsubishi Gas Chemical Co., Ltd.), acrylate resins (Elmatex® 749-7 produced by Mitsui Toatsu Chemicals Inc.) saturated polyester resins (Vilon® 200, 103 produced by Toyobo Co., Ltd.), and the like. Examples of resins in Group B are styrenic copolymers, polycarbonates, polysulfones, polyether sulfons, polyallylene esters, etc. Films and sheets are obtained from these synthetic resins by drying, coagurating or melt-extruding methods.

The drying method is most suitable for yielding an optical isotrope of the obtained film. The thickness of the film is usually from 5 to 1000 μm, preferably from 20 to 200 μm. If the thickness is less than 5 μm, it is difficult to laminate the sheet on the light-polarizing film. If the thickness exceeds 1000 μm, winding up of the sheet is difficult and an efficient production by utilizing an endless sheet is not realized. The rolled sheet may result in curled or bent panels.

When a resin in Group B is employed, at least one surface of the sheet is coated or impregnated with a curable synthetic resin and/or a monomer that is cured to give a laminated film which is practically optically isotropic. These treatments make the sheet resistant to organic chemicals and liquid crystals. Moreover the heat resistance, water vapor permeability and bondability to a conductive layer are improved. Therefore, such treatments as described above could also be applied on a sheet made from a resin in Group A. The curing resins and/or monomers used in the present invention are unsaturated monomers and/or prepolymers thereof. Examples are epoxy resins, melamine resins, acrylate resins, phenoxyether polymers, urea resins, phenolic resins, urethane resins, unsaturated polyester resins, etc. These resins can be applied, if necessary, with solvents, reaction initiators, catalysts, UV absorbers, other stabilizers, etc. The application methods are any of the usual methods, such as spray coating, gravure coating, reverse coating, kiss coating, Meyerbar coating, air-knife coating, dip coating, etc. Heating (commonly at 80° C. to 200° C. for 10 seconds to 1 hour), or irradiation with active light (commonly uv light of wave length from 200 to 400 mμ) or other electromagnetic radiation (electron rays, γ-rays, etc.) can be employed for curing. The thickness of the curing layer of the present invention formed at least on one surface of the amorphous synthetic resin of the present invention is from 1 μm to 10 μm, preferably from 2 μm to 5 μm. This layer can be penetrated into the amorphous resin layer or can be bonded chemically. When the thickness of the curing layer is less than 1 μm, chemical resistance, liquid crystal resistance, water vapor permeability and heat resistance are not sufficiently high. A curing layer of more than 10 μm thickness is not desirable in terms of flexibility and bondability. The laminated film with a curing layer is substantially optically isotropic.

The curing resins applied by coating or impregnation are described by way of example. First, the preferable acrylate resins are polyfunctional unsaturated monomers and/or radically produced oligomers thereof whose main components are such a compound as having at least three acryloyloxy groups and/or methacryloyloxy groups within the molecule. Especially desirable are compositions of unsaturated monomers or/and their radically polymerized oligomers, said compositions containing, based on total unsaturated monomers at least 50 weight %, preferably 70 weight %, and most desirably 90% or more of a polyfunctional unsaturated monomer containing at least 3(metha)acryloyloxy groups.

Examples of said polyfunctional unsaturated monomers having at least three acryloyloxy groups are pentaerythiritol tetramethacrylate, trimethylolpropane trimethacrylate, dipentaerythritol tetramethacrylate.

Preferred examples of bifunctional monomers are those having residual group of less than 100 carbon atoms between two acryloyloxy groups, e.g. hydrocarbon residue, polyether residue or polyester residue. Examples thereof include ethyleneglycol dimethacrylate, 1,4-butanediol dimethacrylate, polyethylene glycol dimethacrylate, and the like. Examples of monofunctional monomer include 2-hydroxymethyl methacrylate, and the like. To increase the smoothness of the coated layer after curing, a small amount of a photopolymerization initiator and/or a radical initiator is added to the unsaturated monomer and the radical polymerization is conducted at an ambient temperature to 100° C. (preferably under 50° C.). This reaction is conducted under an inert gas, and it is terminated before gelation by blowing an oxygen-containing gas. The suitable solvents are such ketones as methylethylketone and ethers as methylcellosolve.

As curing catalysts, usually a photopolymerization initiator and/or a radical initiator are added in the proportion of 0.01 to 10 weight %, preferably 0.1 to 5 weight % based on the total unsaturated monomers and/or radically produced oligomers thereof to increase the curing efficiency. Examples of photopolymerization initiators include such benzoin compounds (e.g., benzoin ethyl ether), benzophenones, (e.g., p-chlorobenzophenone), naphthoquinones, anthraquinones, etc. Examples of radical initiators are peroxides such as 2,4-dichlorobenzoyl peroxide, lauroyl peroxids, benzoyl peroxide etc., and azo compounds such as azobisisobutyronitrile, etc.

Secondly, the preferable cross-linked phenoxyether resins used to coat on or penetrate into resins in Group B are the same type of resins as described in the production of the sheet or film in the present invention.

Thirdly, the preferable epoxy polymers coated on or penetrated into the polymers in Group B are glycidylether of such aromatic phenols as 2,2'-bis(p-hydroxy)phenylpropane, 2,2'-bis(4-hydroxy-3,5-dibromophenyl)propane, 1,1,2,2-tetrakis(p-hydroxyphenyl)ethane, resorcin, hydroquinone, etc.; glycidylethers of phenol novolacs; cresol novolacs etc.; such alicyclic epoxy resins as vinylcyclohexene diepoxide, dicyclopentadiene diepoxide, (3',4'-epoxycyclohexylmethyl)-3,4-epoxycyclohexanecarboxylate, 3-(glycidyloxylethoxyethyl)-2,4-dioxaspiro(5,5)-8,9-epoxyundecane, etc.; such heterocyclic epoxy resins as triglycidyl isocyanurate; N,N-diglycidyl derivatives of 5,5-dimethylhydantoin, etc., such alkyl epoxy resins as ethylene glycol diglycidyl ether, propylene glycol diglycidyl ether, neopentylglycol diglycidyl ether, glycerin diglycidyl ether, etc.; and such cycloalkyl epoxy resins as hydrogenated bisphenol A diglycidylether, etc.

The examples of curing agent used along with the above described epoxy resins include such alkylamines as diethylenetriamine, triethylenetetramine, m-xylylenediamine, diethylaminopropylamine, etc., with which are used hydroxy containing compounds such as phenol, bisphenol A, phenol resins as a catalyst; such aromatic amines as methaphenylenediamine, diaminodiphenylsulfone, 4,4'-methylenedianiline, etc., with which are used phenol, boron trifluoride complex, etc. as a catalyst; such secondary and tertiary amines as benzyldimethylamine, dimethylaminomethylphenol, N-methylpiperazine, etc.; such acid anhydrides as maleic anhydride, phthalic anhydride, etc.; polyamide resins; polysulfide resins; such boron-amine complexes as boron-trifluoride-monomethylamine complex; novolac resin; 2-ethyl-4-methylimidazole; 2-(2-dimethylaminoethoxy)-4-methyl-1,3,2-dioxabornane; and the like.

Other resins having good compatibility with epoxy resins can be blended. Examples of these resins are melamine resins (e.g. Melan®-11 produced by Hitachi Chemicals Co., Ltd.), urea-formaldehyde resins (e.g. Uban®10S), aniline resins, xylene resins (e.g. Nikanol® LL), saturated polyester resins (e.g. Vilon® 200 produced by Toyobo Co., Ltd.), polyurethane resins (e.g. Millionate® MR, Millionate® MT produced by Nippon Polyurethane Co., Ltd.), furfural resins, polyamides, polyvinyl chloride, etc.

The transparent sheets or films are laminated on the light-polarizing film by hot glueing and adhesive bonding, or otherwise these sheet can be directly formed on the light-polarizing film through such well-known methods as drying. In case of hot glueing, the pressed surface of the transparent film are desirably preswollen or melt-softened before lamination to the light-polarizing film. When adhesive bonding is carried out, adhesives with high transparency are selected from the commercial and newly-developed ones. Typical examples of adhesives are polyurethanes, acrylates, cyanoacrylates, olefinics and epoxy adhesives.

On either side of the transparent film laminated by the above described procedure, a transparent conductive layer is formed. The suitable methods to form this layer are vacuum metal evaporation, chemical depositing, spattering and spraying. The most desirable methods are vacuum metal evaporation and sputtering by which layers of metal oxides such as $SnO_2$, $In_2O_3$ and mixtures of these, and metals such as Au, Pt, Pb are formed. These layers become transparent on heating. The lately developed spattering that is operated at a precipitating speed of from 3 to 15 Å/sec. under a pressure of $3 \times 10^{-5}$ to $5 \times 10^{-2}$ Torr gives instantaneously a transparent conductive layer having a thickness of 20 to 1000 Å without heat oxidation. The electron conductivity of thus obtained transparent conductive layer is from 0.1 to 5 k$\Omega$/cm$^2$ and its visible light transparency is higher than 80%.

On the laminated sheet having a transparent conductive layer, a biaxially stretched polyethylene terephthalate film or sheet can be formed to the opposite side of the transparent conductive film for reinforcement. The biaxially stretched ethylene terephthalate polyester film used in the present invention is composed of a dicarboxylic acid (in which 85 mol % or more is terephthalic acid) and a glycol, and it has a heat distorsion temperature of higher than 130° C. to realize a reinforcing effect to the laminated sheet. The most suitable examples are polyethylene terephthalate and polytetramethylene terephthalate in the view of rigidity, flexibility and heat resistance of their biaxially stretched films. The thickness of these film is not critical but usually, it is in the range of 5 to 1000 $\mu$m, preferably 15-200 $\mu$m. Films thinner than 5 $\mu$m decline to have a poor reinforcing effect.

The laminated light-polarizing sheet produced by the above described procedure in the present invention can be applied to a liquid crystal display device, but, if necessary, it can be supplied as the following forms.

First, the light-polarizing film is provided with the following light filter properties.

(1) a light transmittance of not less than 60% within the wavelength range of 500 to 800 m$\mu$.

(2) a light transmittance of not more than 10% within the range of 420 to 230 m$\mu$.

The reason is to prevent photodeterioration of a liquid crystal and a light-polarizing film. For this object, for an example, the procedure proposed in Japanese Patent Laid Open No. 117443/1978 is applied. That is to say, the transparent sheet is dipped in a solution of a yellow dye having a maximum light absorption around 400 m$\mu$ and a UV absorber for several seconds to several ten minutes. Alternatively the yellow dye and the UV absorber may be admixed with the adhesive.

The second embodiment comprises laminating a reflective sheet on one side of the light-polarizing film (if a transparent film has been laminated on both sides, the surface of one of the films). The reflective sheet may for example be a sheet of gold, silver, copper, aluminum or the like, a chrome-plated sheet (about 10 to 100 $\mu$m thick) or a metal-deposited plastic film. If the surface of the vapor-deposition substrate plastic sheet is previously roughened, a non-directional reflection surface can be advantageously obtained. It is also possible to vapor-deposit aluminum or the like on one side of the transparent acrylic film so as to provide the film with a reflective function, the preferred thickness of such a vapor-deposited layer being about 50 to 3000 Å.

The transparent light-polarizing sheet of the present invention is constructed as described above. Typical examples are illustrated in FIGS. 2 to 6. In the figures, (16) is a cured film, (9') is an adhesive layer having light filter properties, (10') is a transparent film having light filter properties and other symbols have the same meanings as in FIG. 1.

Literal pattern is formed by treating the conductive layer (2) in accordance with the procedure shown in FIG. 1 to the light-polarizing film having a transparent conductive layer. And the light-polarizing film thus obtained can be applied as a display panel material for a watch, a desk calculator, a controller of light transmittance volume, an optical shutter, a graphic display device and the like. Except for application as a liquid crystal display device, it can be broadly used for an electroluminescence electrode, a photoconductive sensitizer, a membrane heater used for a windowshield of aircraft, electric cars and automobiles, and a light-selective filter used for solar energy collectors, green houses, window panes of buildings and the like.

Effects of the present invention can be summarized as follows.

(1) The light-polarizing film of the present invention does not have a pressure sensitive adhesive layer as shown in FIG. 1, and therefore the reduction of its thickness is possible and it shows heat resistance. Also it does not have problems of bubble forming or delamination when it is used in a liquid crystal display device at an elevated temperature.

(2) When compared with plastic plates, the light-polarizing sheet of the present invention can be more easily assmebled continuously in panels.

(3) Resistances to liquid crystals, organic chemicals, water vapor, heat and light are improved.

(4) The thickness of the panel is reduced significantly resulting in widening the visible angle, brightening the display, reducing the weight and realizing the production of a large display panel.

The measuring methods for the properties defined at the present invention are as followings.

1. Retardation value

The senarmontconpensator attached to a polarizing microscope (manufactured by Nippon Chikagaku Co., Ltd.) is used. The retardation value is determined with a light source of sodium.

2. Heat distortion temperature

A test piece of 5 mm×20 mm is set as free and it is allowed to stand at a predetermined temperature for 3 hours. The change of length of the test piece is measured. When the change is not more than 1 mm, the sample is considered to be dimensionally stable against heat.

3. Average visible light transmittance

The spectrophotometer MPS-5000 made by Shimadzu Co., Ltd. is used. The transmittance at every 5 m$\mu$ in the range of 400 m$\mu$ to 700 m$\mu$ is measured. The value is a mathematical average.

4. Water vapor permeability

Measured in accordance with JIS Z-0208.

5. Izod impact strength

Determined in accordance with ASTM D256.

6. Degree of swelling in solvents

A test piece of 30 mm in length and 5 mm in width is immersed at 70° C. for 10 hours in such solvents as cyclohexanone, toluene, ethylcellosolve acetate, isopropyl alcohol and a biphenyl-type liquid crystal. The degree of swelling is calculated by the following equation.

$$\text{Degree of swelling (\%)} = \frac{l - l_o}{l_o} \times 100$$

where
$l_o$; sample length before immersion
$l$; sample length after immersion

7. Flexibility

Figure 17:
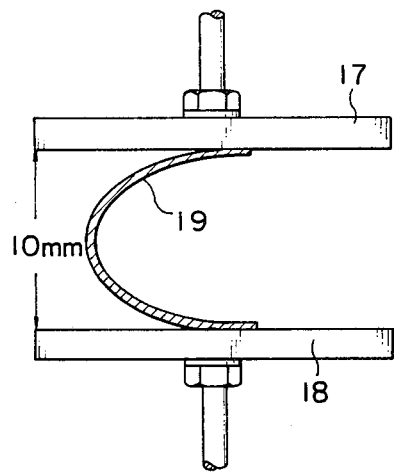
FIGS. 17 and 18 illustrate side elevational view showing the procedure of a flexibility test.
Figure 18:
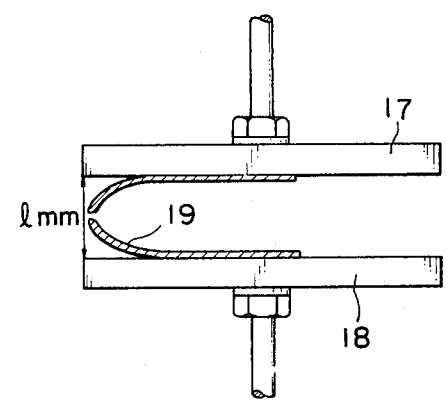

As shown in FIGS. 17 and 18, a test piece (19) of 5 mm in width and 10 mm in length is set in bendable state between two parallel metal plates (17, 18: 20 mm×20 mm) with a clearance of 10 mm. The test piece is flexed at 23° C. at a speed of 10 mm/min. until it fails. The critical bending length is the clearance of two metal plates when the test piece breaks.

The following examples illustrate the present invention but are not to be construed as limiting the scope thereof. In the following, the term "parts" invariably means "parts by weight".

EXAMPLE 1

A DMF solution of acrilonitrile/methylacrylate copolymer (the content of methylacrylate is 5 mole %) is spread on a glass plate. After drying a film of 70$\mu$ in thickness is formed. The properties of this film are as follows; average visible light transmittance: 89% dimensional stability to heat: 148° C., retardation value; about 3 m$\mu$, Izodt impact strength: 15 kg·cm/cm, critical bending length: 0.1 mm. The film is excellent in chemical stability, flexibility and mechanical strength.

An adhesive solution (Solution A) is coated on this polyacrylonitrile film (hereafter referred to as PAN) with a doctor knife (gas: 4/1000 inch) and dried on a metal frame at 80° C. for 2 minutes in a hot-air circulating oven. The coating weight of the adhesive is 13.6 g/m$^2$.

| Composition of the adhesive solution A | |
|---|---|
| Urethane adhesive Takelac ® A-371 produced by Takeda Chemical Industries, Ltd. | 45 parts by weight |
| Curing agent Takenate ® A-10 produced by Takeda Chemical Industries, Ltd. | 7 parts by weight |
| Ethyl acetate | 50 parts by weight |

A light-polarizing film composed from a dichroic dyes (Iodine is added partially) and ethylene/vinyl alcohol copolymer base sheet is bonded to the surface of the adhesive layer on the film at 80° C. for 3 seconds under a pressure of 3.0 kg/cm$^2$. A dichroic (partially iodined) light-polarizing sheet laminated with a PAN film on one side is obtained.

Further on the unlaminated surface of the above light-polarizing sheet, a PAN film having an adhesive layer described above was bonded at 80° C. for 3 second under a pressure of 3.0 kg/cm$^2$. A dichroic light-polarizing sheet laminated with a PAN film on both sides is obtained. On the one surface of the above light-polarizing sheet laminated with a PAN film on both sides, a transparent conductive layer is formed under the following conditions. A flat light-polarizing sheet having a transparent electron conductive layer is obtained without heat distorsion.

The thickness of the conductive layer is 110 A. The obtained light-polarizing sheet is optically homogeneous and it has the following properties; resistivity; 1 k$\Omega$/cm$^2$, average visible light transmittance; 42%, degree of polarizing; 85%. The test results of heat resistance and moisture resistance are shown in Table 1.

Conditions To Form Conductive Layer

Low temperature sputtering equipment is used
Target: In$_2$O$_3$ 95 wt%, SnO$_2$ 5 wt%
Pressure: 4×10$^{-3}$ Torr
Power: 450 W
Deposition Speed: 8 A/sec.

Figure 7:
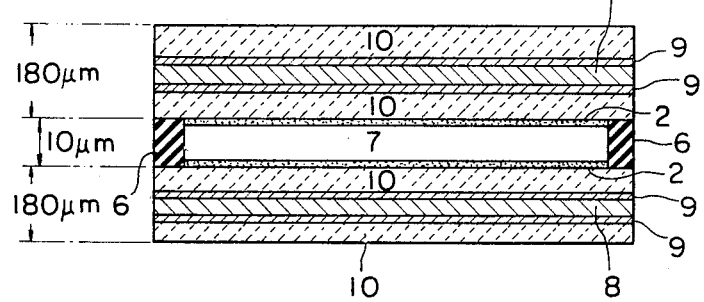

A thin-layer liquid crystal display panel illustrated in FIG. 7 is prepared from the above described light-polarizing sheet laminated with a transparent conductive layer. The total thickness of the panel is lower than 400 $\mu$m. The panel is exposed to heat at 100° C. for 150 hours and to moisture at 80° C. for 150 hours under a relative humidity of 92%. The display efficiency remains unchanged and no signs of bubble formation and delamination are observed.

COMPARATIVE EXAMPLE 1

Figure 8:
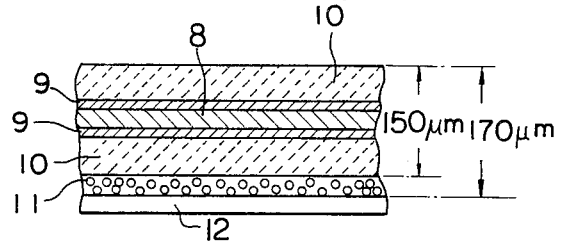
FIG. 8 illustrates a section of a light-polarizing sheet on the market.
Figure 9:
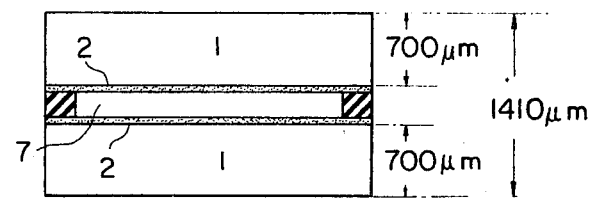
Figure 10:
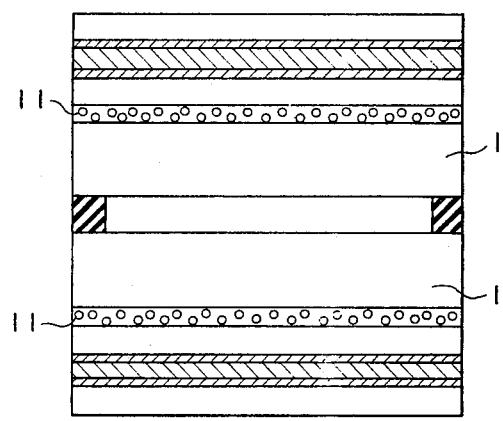

A conventionally used liquid crystal display panel is prepared. From a commercial laminated sheet illustrated in FIG. 8, the release film (12) is peeled off and the pressure sensitive adhesive layer (11) is exposed. On the surface, a commonly used liquid crystal unit (FIG. 9) made of glass plate (700 $\mu$m) is bonded to obtain a liquid crystal display panel. The thickness of the panel is more than 1700 $\mu$m and the visible angle is shallow.

When this display panel is exposed to moisture in the same procedure in Example 1, bubble is formed in the pressure sensitive adhesive layer (11) and delamination is observed at the end of the panel.

COMPARATIVE EXAMPLE 2

Figure 11:
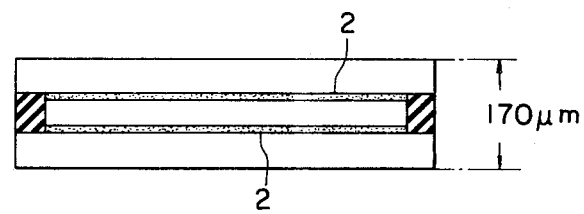

According to the same procedure as in Comparative Example 1, the release film (12) on the light-polarizing film having a pressure sensitive layer (FIG. 8) is peeled off, and the liquid crystal unit from the polyacrylonitrile film of 80 μm in thickness described in Example 1 (FIG. 11) is bonded on the pressure sensitive adhesive layer to obtain a liquid crystal display panel (FIG. 12). The thickness of this panel is 500 μm in total and visible angle is wide.

When this panel is exposed to heat at 100° C. for 150 hours as described in Example 1, the display efficiency was lost due to the bubble formation in the pressure sensitive layer and the delamination at the end of the panel as same manner in Example 1.

EXAMPLE 2

On one surface of a melt-extruded polyethersulfone film (thickness: 80 μm, Retardation value: 12 mμ), a surface curing solution of the following composition is coated with an applicator (15 μm) and heat treated at 130° C. for 7 minutes after drying.

| | |
|---|---|
| Pentaerythritol tetraacrylate | 40 parts by weight |
| Benzoin ethylether | 0.02 parts by weight |
| Methylcellosolve | 60 parts by weight |
| Benzoylperoxide | 1.5 parts by weight |

The obtained composite film is optically homogeneous, tough, chemically stable and flexible. It has the following properties; average visible light transmittance: 85%, dimensional stability to heat: 160° C., retardation value: 15 mμ, Izodt impact strength: 3.5 kg-cm/cm, critical bending length: 3 mm, degree of swelling to chemicals at the surface: 0.1%.

An adhesive solution (Solution A: in Example 1) is coated on the opposite surface (bare polyethersulfone surface) of the cured polyethersulfone, and dried on a metal frame at 80° C. in a hot-air circulating oven. The coating weight of the adhesive is 10.72 g/m². On the adhesive layer, a light-polarizing film of an ethylene/vinyl alcohol copolymer-iodine is bonded at 80° C. under a pressure of 3.5 kg/cm² to obtain a light polarizing film of an ethylene/vinyl alcohol copolymer-iodine having a cured polyethersulfone layer. Further, on the unlaminated surface of a light-polarizing film (a bare light-polarizing film) having the above described polyethersulfone layer on one surface, another polyethersulfone film coated with a light stable adhesive layer (Solution B) of the following composition is bonded at 80° C. under a pressure of 3.5 kg/cm² to obtain a transparent light-polarizing sheet laminated on both surfaces with the cured polyethersulfone film as illustrated in FIG. 13. The results of heat resistance and moisture resistance tests are shown in Table 1.

| Composition of the adhesive solution B | |
|---|---|
| Urethane adhesive Takelac ® A-371 produced by Takeda Chemical Industries, Ltd. | 45 parts by weight |
| Curing agent Takenate ® A-10 produced by Takeda Chemical Industries, Ltd. | 7 parts by weight |
| Yellow disperse dye C.I. disperse yellow-60 Resoline Yellow ® RL | 0.125 parts by weight |
| UV absorber (2,2',4,4'-tetrahydroxy-benzophenone) | 1.5 parts by weight |
| Ethyl acetate | 50 parts by weight |

On the other hand, on the unlaminated surface of a light-polarizing film (a bare light polarizing film) having the above described polyethersulfone layer on one surface, a polyester film deposited with alminium (nondirectional reflective layer) is bonded in the same procedure as described above with an adhesive solution A to obtain a polarizing sheet having a reflex plate as illustrated in FIG. 14.

On one cured surface of the light-polarizing sheet composed form the ethylene/vinyl alcohol copolymer and each transparent and reflective iodine laminated with cured surface layer, a transparent conductive layer is formed by the same procedure as Example 1 to obtain a liquid crystal display panel illustrated in FIG. 15. The panel thus obtained is exposed to heat at 100° C. for 150 hours and to moisture at 80° C. for 150 hours under a relative humidity of 92%. The display efficiency remains unchanged and no sign of bubble formation or delamination are observed.

EXAMPLE 3

100 parts by weight of dioxane, 15 parts by weight of a phenoxy resin (Bakelite Phenoxy Resin ®) and 16 parts by weight of an adduct of tolylene diisocyanate and trimethylolpropane are mixed and dissolved at an ambient temperature. A tacky film of 80 μm in thickness is obtained after drying this solution. On both surfaces of a light-polarizing film composed of a polyvinyl alcohol grafted with glycidyl methacrylate and a dichroic dyes (partially iodinated), the tacky film described above is bonded at 80° C. for 3 seconds under a pressure of 3.0 kg/cm². This light polarizing sheet laminated with the phenoxy resin on both surfaces is heated at 80° C. for 40 hours to obtain a laminated light-polarizing sheet. On one surface of this light-polarizing sheet laminated with the phenoxy resin, a transparent conductive layer is formed under the same conditions as Example 1. Thus obtained light-polarizing sheet having a conductive layer of 100 Å in thickness is optically homogeneous and excellent in chemical resistance and dimensional stability to heat. It has the following properties; resistivity: 1 kΩ/cm², dimensional stability to heat: 140° C., degree of swelling to chemicals: 0%, critical bending length: 2 mm, average visible light transmittance: 85%, degree of polarization: 42%. Results of the heated moisture resistance tests on this light-polarizing sheet are shown in Table 1. Further, a thin layered liquid crystal display panel as illustrated in FIG. 15 is prepared from the laminated light-polarizing sheet. The panel thus obtained is exposed to heat at 100° C. for 150 hours and to moisture at 80° C. for 150 hours under a relative humidity of 92%. The display efficiency remains unchanged and no sign of bubble formation or delamination is observed.

EXAMPLE 4

On one surface of a biaxially stretched polyethyleneterephthalate (PET) film, solution A in Example 1 is knife-coated (gap: 100 μm) and dried on a metal frame at 80° C. for 2 minutes in a hot-air circulating oven. The coating weight of the adhesive is 13.6 g/m². On the adhesive layer of the obtained film, a light-polarizing film conposed of a polyvinyl alcohol grafted with glycidyl methacrylate and a dichroic dyes is bonded at 80° C. for 3 seconds under a pressure of 3.0 kg/cm² to obtain a light-polarizing sheet having a PET film on one surface.

On the opposite surface to the PET layer, a phenoxy resin solution described in Example 3 is coated with the same doctor knife (gap: 300 μm) and dried at 70° C. for one hour and cured at 150° C. for 2 minutes on a metal frame in air circulating ovens to obtain a dichroic light-polarizing sheet laminated with a PET film on one side and with a transparent optically non-rotary film of a phenoxy resin on the other side. The coating thickness of the phenoxy resin is 48 μm. On the phenoxy resin layer of the obtained laminated light-polarizing sheet on both surfaces, a transparent conductive layer is formed under the same conditions as in Example 1 to obtain a light-polarizing sheet having a transparent conductive layer. The light-polarizing sheet having the transparent conductive layer of 110 Å in thickness shows the degree of polarization of 85% and is excellent in chemical resistance, flexibility and optical homogeneity. The test results of the above described light-polarizing sheet to heat and moisture are shown in Table 1. Further, a thin layer liquid crystal display panel illustrated in FIG. 15 is prepared from the laminated light-polarizing sheet. The panel thus obtained is exposed to heat at 100° C. for 150 hours and to moisture at 80° C. for 150 hours under a relative humidity of 96%. The display efficiency remains unchanged and no signs of bubble formation and delamination are observed.

COMPARATIVE EXAMPLE 3

Figure 16:
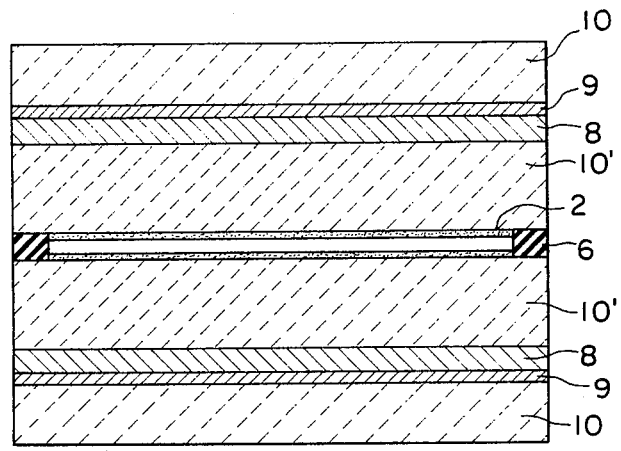

On the surface (10') of the PET film laminated on the light-polarizing sheet prepared by the same procedure as in Example 4, a transparent electron conductive layer is formed. A display panel as illustrated in FIG. 16 is prepared. This panel fails to produce clear indications in response to input signals.

EXAMPLE 5

50 parts by weight of epoxy resin (Epikote ® 828, produced by Shell Chemical Co., Ltd.) and 7 parts by weight of methaphenylenediamine is agitated to give a viscous liquid. On the surface of the polysulfone film described in Example 2, this liquid is coated with a doctor-knife (gap: 5 μm), and cured at 100° C. for one hour, and additionally at 160° C. for 10 hours to obtain a transparent composite film. The film have the following physical properties; heat distortion temperature: 160° C., retardation value; 15 mμ, Izodt impact strength: 2.0 kg·cm/cm, critical bending length: 3 mm, water vapor permeability 1 g/24 hr/m², degree of swelling to chemicals: 0%. After forming an adhesive layer on the polyethersulfone surface of the composite film by the same procedure as in Example 1, the adhesive layer is bonded on both side of the dichroic light-polarizing film based on a polyvinyl alcohol grafted with methylmethacrylate by the same procedure as described in Example 1, to obtain a laminated light-polarizing sheet of a dichroic dye. On the surface of the epoxy resin, a conductive layer is formed. The test results of this laminated light-polarizing sheet to heat and moisture are shown in Table 1. Further, a liquid crystal display panel is prepared from this laminated light-polarizing sheet by the same procedure as described in Example 1. Thus obtained panel is exposed to heat at 100° C. for 150 hours and moisture at 80° C. for 150 hours under a relative humidity of 92%. The display efficiency remains unchanged and no signs of bubble formation and delamination are observed.

EXAMPLE 6

After an adhesive layer of the following composition is formed on the cellulose triacetate film (thickness: 50 μm retardation value: 2 mμ), it is bonded on both surface of a polyvinylalcohol-iodine light-polarizing film to obtain a laminated light-polarizing sheet on both surfaces. The surfaces are cured by the procedure as described in Example 2. The test results of the laminated light-polarizing sheet to heat and moisture are shown in FIG. 1.

Then, one cured surface of the light-polarizing sheet is primed with 0.03% by weight of tetraoctyltitanate in n-hexane. The primed surface is dried at 70° C. for 30 minutes. A transparent conductive layer is formed by a low temperature sputtering procedure under the following conditions. The thickness of the conductive layer is 250 Å and the resistivity is 600 Ω/cm².

| Composition of the adhesive solution | |
|---|---|
| Acrylate adhesive SK dine ® 701 produced by Soken Chemical Co., Ltd. | 10 parts by weight |
| Curing Agent | 0.0022 parts by weight |
| Ethyl acetate | 90 parts by weight |
| The conditions for sputtering | |
| Target: | InO₂ 93 wt %, SnO₂ 7 wt % |
| Gas: | Argon 85%, O₂ 15% |
| Pressure: | 5 × 10⁻³ Torr |
| Power: | 400 W |
| Deposition speed: | 12 Å/sec |

EXAMPLE 7

A polyethersulfone film having a cured surface is laminated on the light-polarizing sheet composed of a polyvinyl alcohol and a dichroic dye to obtain a light-polarizing sheet by the same procedure as described in Example 2. The surface of the light-polarizing sheet is primed with silane coupling agent, and then, sputtered with a mixture of $In_2O_3$ 95 parts by weight and $SnO_2$ 5 parts by weight under a pressure of $3 \times 10^{-5}$ Torr at a deposition speed of 18 Å/sec. The thickness of the deposit is 140 Å. It is treated at 140° C. to give a transparent conductive layer having a resistivity of 2.8 kΩ/cm². Thus obtained panel is exposed to heat at 100° C. for 150 hours and to moisture at 80° C. for 150 hours under a relative humidity of 92%. The display efficiency remains unchanged and no signs of bubble formation and delamination are observed.

COMPARATIVE EXAMPLE 4

The polyethersulfone film indicated in Example 2 is excellent in heat distorsion temperature (180° C.), critical bending length (0.0 mm not-broken), water vapor permeability (1 g/24 hr·m²) and average visible light transmittance (85%), but it is poor in chemical resistance. A liquid crystal display panel is prepared from the laminated light-polarizing sheet having a conductive layer formed by the same procedure as described in Example 2. The panel is exposed to heat at 80° C. for 150 hours resulting in reduction of the display efficiency and partial melting of the panel.

|  | Example 1 | Example 2 | Example 3 | Example 4 | Example 5 | Example 6 |
|---|---|---|---|---|---|---|
| Initial degree of polarization (%) | 85 | 85 | 85 | 85 | 85 | 85 |
| After humid test*[1] |  |  |  |  |  |  |
| (a) Degree of polarization (%) | 82 | 98 | 82 | 84 | 83 | 75 |
| (b) Chain in appearance | no delamination | " | " | " | " | " |
| After heat test*[2] (%) | 83 | 81 | 84 | 85 | 84 | 80 |

[1] 80° C., 92% R.H. 500 hrs.
[2] 100° C., dry, 500 hrs.

What is claimed is:

1. A laminated light-polarizing sheet comprising a light-polarizing film, a polymeric supporting film or sheet having a thickness in the range of 5 to 1000 microns formed to at least one surface of said light-polarizing film, and a transparent conductive layer comprising a metal oxide or a mixture of metal oxides or a metal formed on the surface of said polymeric supporting film or sheet opposite to said light-polarizing film wherein said polymeric supporting film or sheet has the following physical properties:
   Retardation value: not more than 30 millimicrons;
   Heat distortion temperature: not lower than 80° C.;
   Average visible light transmittance: not less than 75%;
   Water vapor permeability: not higher than 30 g/m²·24 hr.;
   Izod impact strength: not less than 1.5 kg·cm/cm;
   Degree of swelling on a surface in a solvent: not more than 0.5%.

2. A laminated light-polarizing sheet according to claim 1, wherein the polymeric supporting film or sheet has a critical bending length of not more than 5 mm.

3. A laminated light-polarizing sheet according to claim 1 or 2, wherein said surface of said polymeric supporting film or sheet on the opposite side with respect to said light-polarizing film is cured after it is coated or impregnated with a monomer and/or curable polymer, the so-formed cured layer having a thickness of from 1 to 10 microns.

4. A laminated light-polarizing sheet according to claim 1 or 2, wherein said polymeric supporting film or sheet is made of a cross-linked phenoxyether polymer obtained on cross-linking reaction between a polyfunctional compound and active hydrogen groups of a phenoxyether polymer having at least 20 units and not less than 50 weight percent of repeat units of the formula:

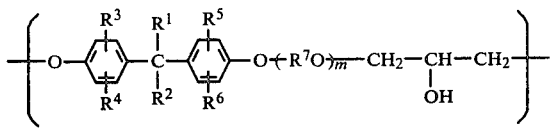

wherein $R^1$ to $R^6$ are independently hydrogen or alkyl groups containing 1 to 3 carbon atoms, $R^7$ is an alkylene group containing 2 to 4 carbon atoms and m is an integer of 0 to 3 or a mixture consisting predominantly of said phenoxyether polymer and one or more other polymers.

5. A laminated light-polarizing sheet according to claim 4, wherein said phenoxyether polymer has the formula:

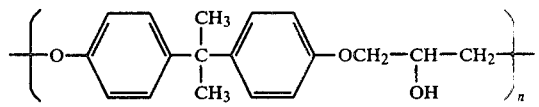

wherein n is an integer of 50 to 500.

6. A laminated light-polarizing sheet according to claim 3, wherein the monomer and/or curable polymer is mainly composed of an acryloyl or methacryloyl compound containing at least 50% of a monomer having at least 3 aryloyloxy and/or methacryloyloxy groups per molecule.

7. A laminated light-polarizing sheet according to claim 3, wherein the curable polymer is a mixture of polyfunctional compound and phenoxyether polymer having at least 20 units and not less than 50 weight percent of repeat units of the formula:

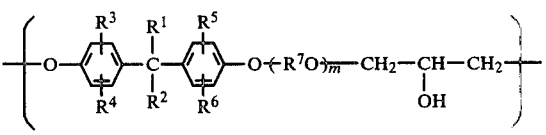

wherein $R^1$ to $R^6$ are independently hydrogen or alkyl groups containing 1 to 3 carbon atoms, $R^7$ is an alkylene group containing 2 to 4 carbon atoms and m is an integer of 0 to 3 or a mixture consisting predominantly of said phenoyether polymer and one or more other polymers.

8. A laminated light-polarizing sheet according to claim 3, wherein said curable polymer consists of an epoxy resin or a mixture thereof with other polymers and a curing agent.

9. A laminated light-polarizing sheet according to claim 3, wherein the polymeric supporting film or sheet is formed of a polymeric material selected from the group consisting of polyethersulfones, polysulfones and polyacrylates.

10. A laminated light-polarizing sheet according to claim 1 or 2, further comprising a biaxially stretched film or sheet of a terephthalate polyester, having a heat distortion temperature of not lower than 130° C., laminated to the opposite side of said transparent conductive layer.

11. A laminated light-polarizing sheet according to claim 10, wherein said terephthalate polyester is polyethylene terephthalate.

12. A laminated light-polarizing sheet according to claim 1 or 2, wherein the laminated light-polarizing film has a light transmittance of not less than 60% within the wavelength range of 500 to 800 microns and of not more than 10% within the range of 420 to 230 microns.

13. A laminated light-polarizing sheet according to claim 1 or 2, further comprising a reflective layer lying on the side opposite to the transparent conductive layer.

14. A laminated light-polarizing sheet according to claim 1 or 2, wherein the light-polarizing element of said light-polarizing film comprises dichroic dyes or polyene linkages.

15. A laminated light-polarizing sheet according to claim 1, wherein the polymeric supporting film or sheet is laminated on the light-polarizing film by hot glueing.

16. A laminated light-polarizing sheet according to claim 1, wherein said polymeric supporting film is laminated on the light-polarizing film by coating said light-polarizing film with a synthetic resin and then curing the same.

17. A laminated light-polarizing sheet according to claim 1, wherein the polymeric supporting film or sheet is bonded on the light-polarizing film.

* * * * *